July 4, 1967 T. J. HARRIS ET AL 3,329,474
DIGITAL LIGHT DEFLECTOR UTILIZING CO-PLANAR
POLARIZATION ROTATORS
Filed Nov. 3, 1963 4 Sheets-Sheet 1
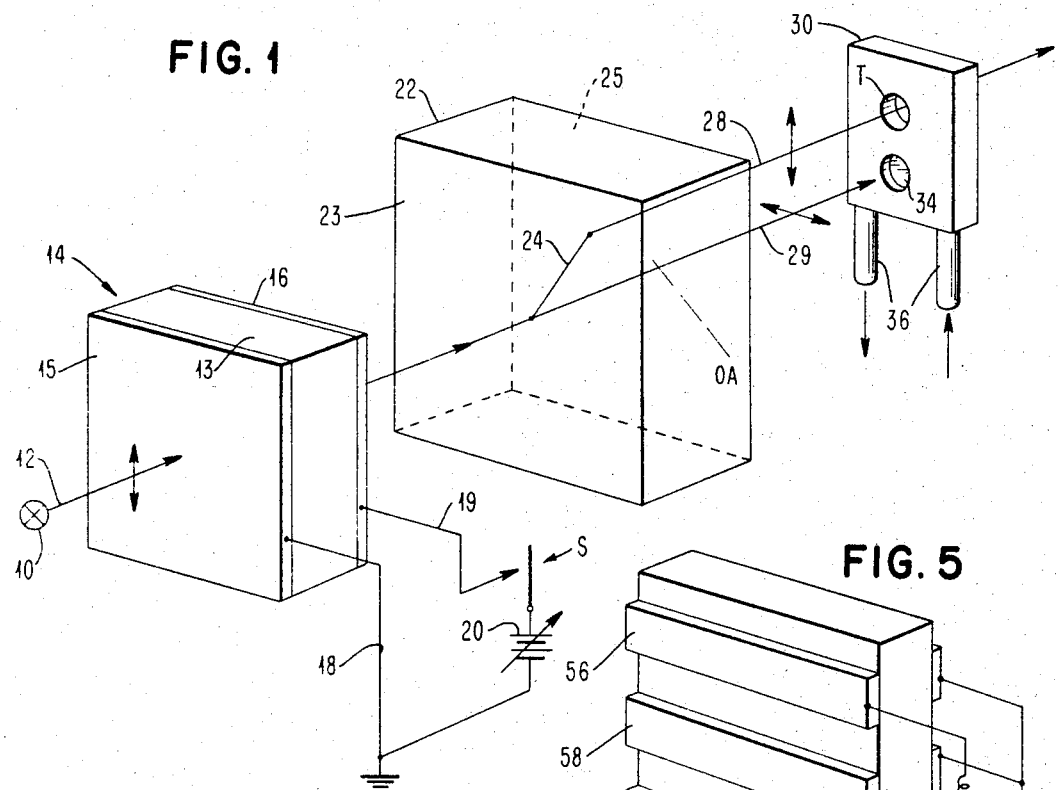
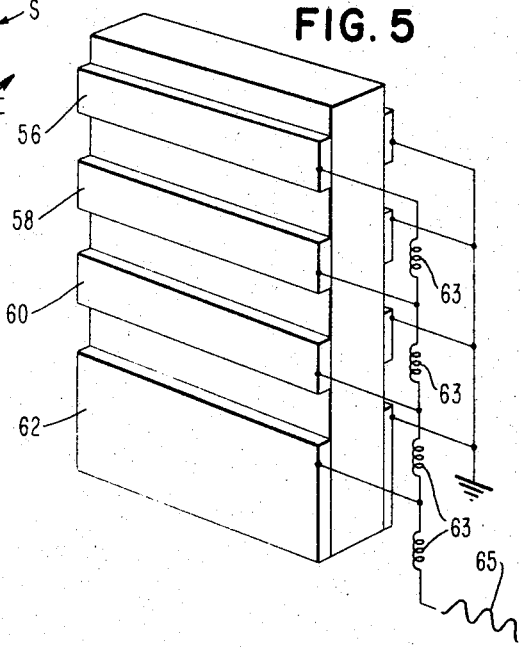
FIG. 4
| APERTURE | S1 | S2 | S3 | S4 |
|---|---|---|---|---|
| T1 | ON | — | — | — |
| T2 | OFF | ON | — | — |
| T3 | OFF | OFF | ON | — |
| T4 | OFF | OFF | OFF | ON |
INVENTORS
THOMAS J. HARRIS
EUGENE SHAPIRO
BY Richard H. Smith
AGENT

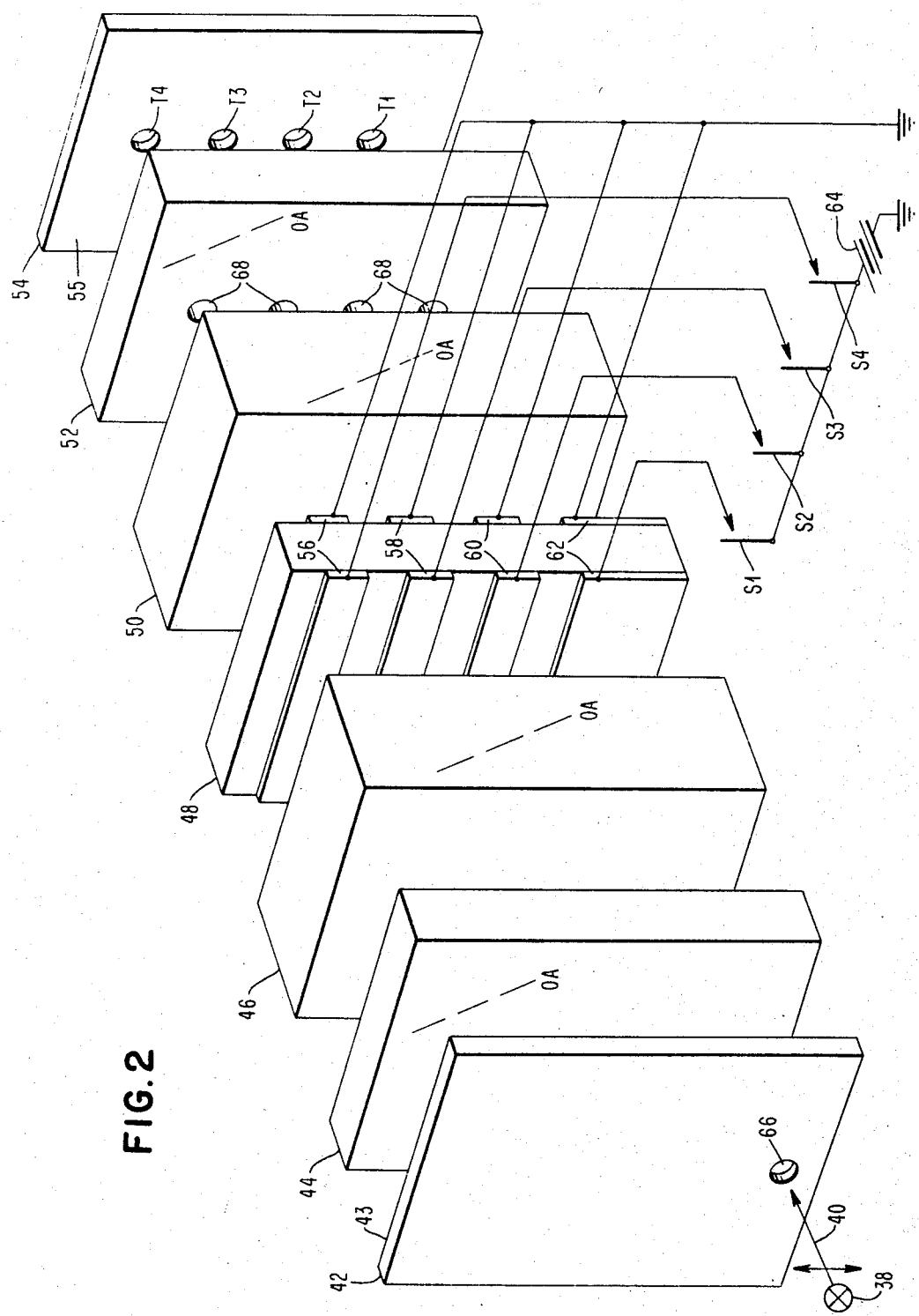

United States Patent Office 3,329,474
Patented July 4, 1967

3,329,474
DIGITAL LIGHT DEFLECTOR UTILIZING
CO-PLANAR POLARIZATION ROTATORS
Thomas J. Harris and Eugene Shapiro, Poughkeepsie,
N.Y., assignors to International Business Machines
Corporation, New York, N.Y., a corporation of New
York
Filed Nov. 8, 1963, Ser. No. 322,484
5 Claims. (Cl. 350—150)

This invention relates to a device for manipulating a beam of optical or near-optical radiation and, more particularly, to a device for modulating the intensity of and selectively positioning such a beam.

The optical maser (laser) has in recent years become perfected to the point where its use is rapidly becoming a commercial practicability. The unique optical or near-optical radiation which it generates is infinitely better suited to manipulation and control than the output from conventional light sources.

The features of laser radiation which increase its controllability are spatial and temporal coherence, high directivity and extreme monochromaticity. Because of these factors, such radiation can be manipulated in much the same way that radio waves, microwaves and electron beams are presently manipulated and can be put to many similar uses.

One of the more promising applications of laser radiation is in the field of information storage, handling and display. The primary attribute of laser radiation which adapts it especially well to such data control applications is its ability to transmit relatively large amounts of energy in a highly collimated beam of extremely small cross sectional area. High speed manipulation of such a beam in, for instance, a scanning pattern provides the basis for direct optical readout of a photographic data store. Conversely, such a scanning system coupled with beam modulation means can be used to "write" data in extremely compact form upon a photo-sensitive record medium. Also optical displays can be generated by such a system in a manner analogous to the operation of the conventional cathode ray tube (CRT).

Naturally, some arrangement of optics is necessary to manipulate a laser beam in this desirable fashion. Such apparatus, to be useful in the field of data control, must possess great speed, accuracy, and stability of operation. Of additional importance is compactness. None of the optical systems available today offer all three of these prerequisites. Systems employing moving mechanical components are the least suitable. Devices which manipulate a beam of optical or near-optical radiation by altering the refractive index of a medium through which it is traveling may have the necessary speed of operation but because they deflect the beam an amount directly dependent on the magnitude of an applied field, magnetic or electrostatic, these devices suffer from the same difficulty experienced by the conventional CRT. That is, as ambient conditions slightly vary the parameters of the control circuitry, the applied field, and thus the amount of beam deflection, is caused to vary. Aging of the circuits is also known to produce this result. Even slight instabilities cannot be tolerated in a system that must operate repetively over long periods of time within spatial tolerances measured in fractions of a millimeter.

It is therefore an object of this invention to provide an improved beam controlling device that is at once fast and stable in its operation and compact in its size.

Another object is to provide an improved beam deflector that operates in discrete steps.

Still another object is to provide an improved beam deflector capable of selectively positioning a single beam of radiation to a plurality of discrete locations.

Yet another object is to provide a selectively operable beam deflector that is controlled by a force field, yet which does not depend upon the magnitude of that field for the degree of the deflection which it imparts to the beam.

In accordance with the invention at least two crystals are aligned so that they are serially traversed by a beam of substantially monochromatic optical or near-optical radiation. The first crystal encountered by the beam is acted upon by a selectively applied force field to alter the status of polarization of the beam. The second crystal is anisotropic in nature and so oriented as to split the ordinary and extraordinary vibrational components of the beam, thereby providing two possible output paths for the beam. The radiation in each of these output paths is then variously utilized in pursuance of the several modulation and deflection results hereinafter described.

The foregoing and other objects, features and advantages of the present invention will be apparent from the following more particular description of the preferred embodiments of the invention, as illustrated in the accompanying drawings.

In the drawings:

FIG. 1 is a schematic diagram depicting a basic deflection and modulation component of the present invention and complements the subsequent description of the fundamental principles upon which the invention operates.

FIG. 2 is a schematic diagram illustrating a preferred embodiment of a beam deflector constructed in accordance with the invention whereby a beam may be selectively deflected to any one of a plurality of linearly aligned points.

FIG. 4 is a chart indicating the various operating states of the control components of the deflector of FIG. 2.

FIG. 5 is a schematic diagram of a high speed switching arrangement for use with the apparatus of FIGS. 2 and 6 to provide such apparatus with a scanning capability.

Figure 3A:
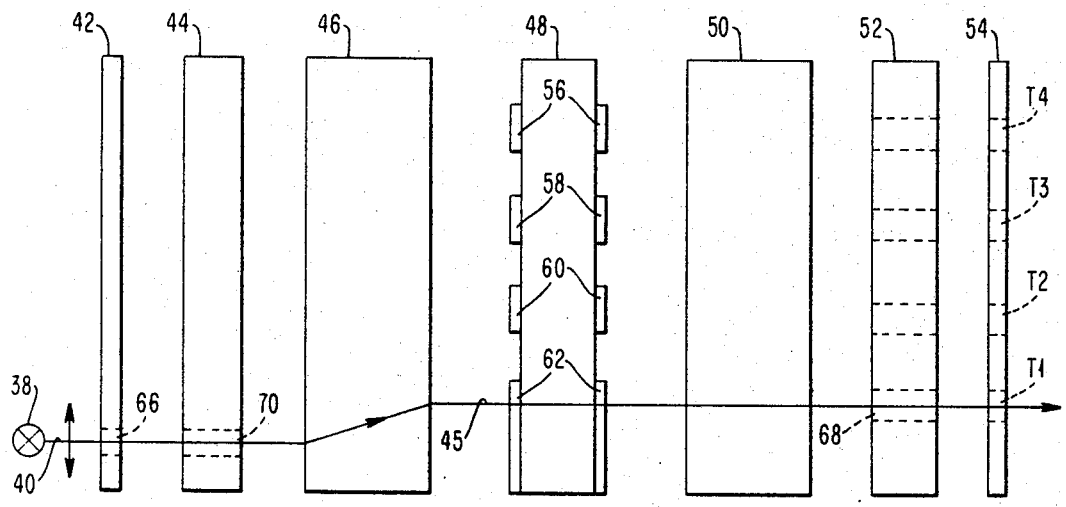
FIGS. 3a and 3b are schematic diagrams showing two conditions of operation of the deflector of FIG. 2.

Referring now to the drawings, a detailed description of preferred embodiments of the invention will be given.

*General description*

A first embodiment of the invention is shown in FIG. 1 and may be operated either to deflect a beam of radiation from a first position to a second position or to modulate the intensity of the beam. Generally, this embodiment includes a beam source 10 which includes any well known means for collimating and linearly polarizing the beam, a selectively operable electro-optic half-wave plate 14 and a doubly refracting crystal 22.

For beam deflection, a linearly polarized, collimated beam 12 is directed through the electro-optic plate 14. External control means, hereinafter more fully described, act upon the plate and cause it to become birefringent, thereby switching the beam's plane of polarization by 90°. With its status of polarization thus altered, the beam, received at normal incidence by the doubly refracting crystal 22, is propagated therethrough as an ordinary (O) ray. As an O ray at normal incidence the beam does not refract at the suface of the crystal. By altering the condition of the control means to allow the beam to pass through the electro-optic plate 14 without change to its status of polarization, beam deflection is seen to occur since the beam propagates through the crystal as an extraordinary (E) ray.

For beam modulation, the external control means are operated to provide a continuous variation of the beam's polarization (generally elliptical) in accordance with a modulation input, such as an amplitude modulated voltage signal. The beam thus possesses (with respect to the doubly refracting crystal 22) both E and O vibrational components varying in amplitude in inverse relation to each other. Splitting therefore occurs in the doubly refracting crystal and two beams of varying intensity emanate from its output face.

Detailed description

Referring to FIG. 1 in more detail, the beam 12 is generated by a laser source 10 and, if necessary, has been collimated by a collimating lens (not shown) and polarized in a vertical plane by a polarizer, for instance Nicol prism (also not shown), before meeting the wave plate 14.

The wave plate 14 comprises a crystal 13 of KDP (potassium dihydrogen phosphate—$KH_2PO_4$) cut so that its parallel front and rear faces are perpendicular to its optic axis. The wave plate is oriented to receive the beam 12 at normal incidence and is approximately one millimeter thick.

A pair of transparent electrodes 15 and 16 are positioned adjacent the front and rear faces, respectively, of the crystal 13. The electrodes may be thin films coated on the crystal or they may be self-supporting structures made of, for example, conductive glass. The electrodes are electrically coupled to a switch S and a voltage source 20 by the leads 18 and 19. Approximately 7.2 kv. (half-wave voltage) is applied between the electrodes when the switch S is on (closed). This potential is sufficient to effect a 90° rotation of the plane of polarization of the beam 12 as it traverses the crystal 13.

For continuous modulation of the status of polarization of the beam, the switch S is left closed and the magnitude of the voltage source 20 is varied between zero and half-wave voltage in accordance with an externally generated information signal.

The doubly refracting crystal 22 is located beyond the wave plate 14. The crystal is cut so that its optic axis (labeled OA in FIG. 1) is inclined with respect to the parallel front and rear faces 23 and 25 of the crystal and lies in a plane perpendicular to those faces. The crystal is oriented so that the beam 12 is received normal to the face 23 and so that the previously described plane of the optic axis is vertical. The doubly refracting crystal is a one centimeter thick calcite (calcium carbonate) crystal.

A mask plate 30 is located behind the crystal 22 and has an aperture T to allow the beam 12, when following the E ray path 28, to leave the apparatus. The plate 30 also serves as a heat sink for absorbing and carrying away the energy of the beam when it is following O ray path 29. For efficient dissipation of the energy of the beam a depression 34 is placed in the plate 30 and has its inner walls contoured at angles calculated to prevent reverse reflection. For further efficiency, the plate 30 is hollowed out behind the depression 34 and a coolant is circulated thereabout by means of a pair of conduits 36.

The apparatus of FIG. 1 may be operated in its beam deflection mode to selectively turn the output beam 28 "on" and "off" in the following manner. The switch S, when closed, causes the wave plate 14 to rotate the plane of polarization of the beam 12 from vertical to horizontal. The beam thus interacts with the crystal 22 as an ordinary ray and propagates through the crystal without deviation from its original path. This carries the beam to the heat sink 34 where it is absorbed, thus being prevented from leaving the system. Under this condition the output beam is cut off.

When the switch S is opened, the vertically polarized beam 12 passes through the wave plate 14 without change to its status of polarization and interacts with the crystal 22 as an extraordinary ray. Therefore, at the surface 23 the beam is refracted into the path 24 and at the surface 25 it is refracted into the output path 28. Under this condition the output beam is not cut off since the aperture T allows it to pass from the system.

Thus, if the switch S is intermittently operated in accordance with, for example, a pulsed information signal representing binary coded data, a beam detector aligned with the aperture T will receive the coded data manifested as intermittent bursts of radiation from the aperture T.

As a beam intensity modulator, the apparatus of FIG. 1 operates with the switch S continuously closed. The voltage source 20 is varied in magnitude between 0 and half-wave voltage by an externally generated AM information signal. The beam 12 is circularly or elliptically polarized for voltages intermediate 0 and half-wave voltage in accordance with the magnitude of the information signal. This non-linear polarization condition imparted to the beam gives rise to a splitting of the beam between the paths 28 and 29. The intensity of the beam in output path 28 is proportional at any given instant to the cosine of the angle of rotation imparted to the major axis of the ellipse of polarization at that instant. A photomultiplier tube may thus be stationed opposite the aperture T to receive the AM information carried on the output beam. Conventional circuitry may be coupled to the photomultiplier to demodulate and amplify the received signal.

For a more detailed explanation of the electro-optic behavior of the KDP crystal 13, whereby this polarization modulation effect is obtained, reference may be had to the American Institution of Physics Handbook, 2nd edition (McGraw-Hill, 1963) at page 6–184.

Other electro-optic crystals than KDP can be used in the wave plate 14. Other such crystals are potassium dideuterium phosphate ($KD_2PO_4$), ammonium dihydrogen phosphate ($NH_4H_2PO_4$), also known as ADP, ammonium dideuterium phosphate ($NH_4D_2PO_4$) and cuprous chloride (CuCl). The well-known Kerr Cell may also function as a selectively operable optical wave plate as may the magnetically operated Faraday rotator. Of course, if any of the above were to be substituted for the KDP crystal 13 of the present embodiment, certain necessary changes in wave plate thickness and field magnitude would be required. Such changes would be well within the capabilities of one having ordinary skill in the art.

The switch S is only symbolically illustrated in FIG. 1. It is to be understood that any voltage switching arrangement may be employed. If the deflector is to be used to transmit binary coded information, in the manner previously described, a high speed switching circuit employing, for example, magnetic cores, vacuum tubes, reed relays, or solid state devices such as silicon controlled rectifiers is preferable. For amplitude modultion of the beam, any conventional vacuum tube voltage modulation circuit may be suitably adapted. Since such switching and modulation circuits do not directly relate to the subject matter of the present invention, and since they may be supplied using presently known electrical techniques, further description of them is deemed unnecessary.

As previously described, the crystal 22 comprises a calcite crystal having a thickness of approximately one centimeter. Since the optimum deviation between the E and the O rays which can be attained with calcite is 6 degrees and 13 minutes, the displacement between output paths 28 and 29 is on the order of one millimeter. The theory behind the "splitting" of the E and O vibrational components of a beam propagating in a uniaxial birefringent medium such as calcite is well developed by Jenkins and White in chapter 26 of their text Fundamentals of Optics, 3rd edition (McGraw-Hill, 1957) and for that reason is not herein described. The crystal 22 may be of any birefringent medium, either uniaxial or biaxial. Besides calcite, other such media are quartz (uniaxial), anthracene (biaxial), naphthalene (biaxial), and sodium nitrate (uniaxial). The "splitting angle" of course will vary depending upon the medium used.

The radiation source 10 of FIG. 1 may be any source of substantially monochromatic, collimated optical or near-optical radiation. Two such sources are carbon and mercury arc lamps equipped with proper filters and collimating optics. However, as previously mentioned, the present invention preferably incorporates a laser light source. Many types of lasers are now known and vary widely in power requirements, efficiency, power output, and directionality and frequency of the radiation produced. For purposes of the present invention, the so-called injection laser is preferred because of its high efficiency and small size, but, of course, other types of lasers may be used.

Because the radiation generated by even the best injection laser structure diverges about 6 degrees from the center line of its forward path, the collimation lens previously mentioned should be employed for best results. Such a lens increases the beam width somewhat, but eliminates most of the beam divergence. If a gas laser or an optically pumped crystal laser using, for example, ruby as its active medium, were used for the source 10, a collimating lens would not be required.

Building upon the principles of operation of the first embodiment of the invention just described, a second embodiment comprising a beam deflector having multiple output paths may be constructed. Such an apparatus is schematically shown in FIG. 2 and will hereinafter be described.

A pair of plane mirrors 42 and 54, a pair of quarter-wave plates 44 and 52, a selectively operable half-wave plate 48 and a pair of doubly refracting crystals 46 and 50 are aligned in serial fashion as indicated in FIG. 2. A radiation source 38 directs a collimated beam 40 of vertically plane polarized radiation into an input aperture 66 in the lower portion of the mirror 42. A similar aperture is included in the first quarter-wave plate 44 (see FIG. 3).

The doubly refracting crystals 46 and 50 are identical in structure and function to the crystal 22 of FIG. 1. As such, these crystals serve as passive beam discriminators, displacing a vertically polarized beam and allowing a horizontally polarized beam to pass undisturbed.

The half-wave plate 48 is identical in structure to the wave plate 14 of FIG. 1 except that instead of having only one pair of transparent electrodes coated on its front and rear faces, the wave plate 48 has four individually controllable pairs of transparent electrodes 56, 58, 60, and 62 vertically spaced across its front and rear faces. These electrodes are electrically coupled in parallel across a D.C. voltage source 64. Four switches S1–S4 are provided to enable selective application of a potential difference to be made to any one of the pairs of electrodes. As indicated, switch S1 controls the electrodes 62 while switches S2, S3, and S4 control, respectively electrodes 60, 58, and 56. The voltage source 64 provides the requisite half-wave voltage to enable the wave plate 48 to rotate the plane of polarization of a beam 90°, providing the beam is propagating in a region of the wave plate bounded by one of the pairs of electrodes. Of course, as with the wave plate 14 of FIG. 1, when no field exists between the electrodes, no polarization change is seen to occur. The regions of the wave plate 48 which are not bounded by a pair of electrodes will always propagate the beam without disturbance, no matter what its status of polarization. This is so because the optic axis of those regions is always parallel to the path of the beam.

For purposes subsequently to become clear, the quarter-wave plate 52 has a set of four apertures 68 aligned with the four sets of electrodes on the wave plate 48. The mirror 54 has a set of four output apertures T1–T4 in alignment with the apertures 68. The mirrors 54 and 42 are reflective on their inner surfaces 55 and 43, respectively.

The quarter-wave plates 44 and 52 are constructed of a birefringent material and in the present embodiment are made of gypsum or mica crystals .0173 millimeter in thickness. Since the optic axis (OA) in each of these wave plates is inclined at 45° and lies in a plane which is perpendicular to the direction of beam propagation, a beam of plane polarized radiation incident normal to the surface of one of the wave plates propagates therethrough without refraction and, upon emergence, is observed to have undergone what effectively amounts to a 45° rotation of its plane of polarization. Looking in the direction of beam propagation, this rotation always occurs in the same sense, whether the beam propagates through the wave plate from front to rear or from rear to front.

Actually, the foregoing reference to a 45° rotation in the beam's "plane of polarization" is made for convenience only and is not technically accurate. In actuality, the linearly polarized light entering the quarter-wave plate is resolved into E and O vibrational components of equal magnitude which undergo a 90° phase shift relative to each other as they traverse the wave plate. The light which emerges is circularly polarized, and as such, has no defined "plane of polarization." Nonetheless, upon retraversal of the quarter-wave plate, the beam is converted from a circular back to a linear state of polarization, having a direction of vibration oriented at 90° to that which it originally possessed. Since the total effect of two passes through the quarter-wave plate is a 90° shift in the plane of polarization, the effect of a single pass is thus, for purposes of convenience, described as a 45° shift in the plane of polarization.

With reference now to FIG. 3a, that phase of the operation of the deflector of FIG. 2 whereby the input beam 40 is directed through the output aperture T1 will be described.

The vertically polarized beam 40 enters the deflector through the apertures 66 and 70. Upon encountering the doubly refracting crystal 46 it is refracted upward and into the horizontal path 45. The switch S1 (FIG. 2) has previously been turned on (closed) so that a "rotation" field is applied to the wave plate 48 in the region bounded by the electrodes 62. The beam in path 45 thus has its plane of polarization switched from vertical to horizontal as it traverses the wave plate. This being so, it passes through the doubly refracting crystal 50 undeviated and leaves the system, still polarized in a horizontal plane, through the lower aperture 68 and output aperture T1.

Figure 3B:
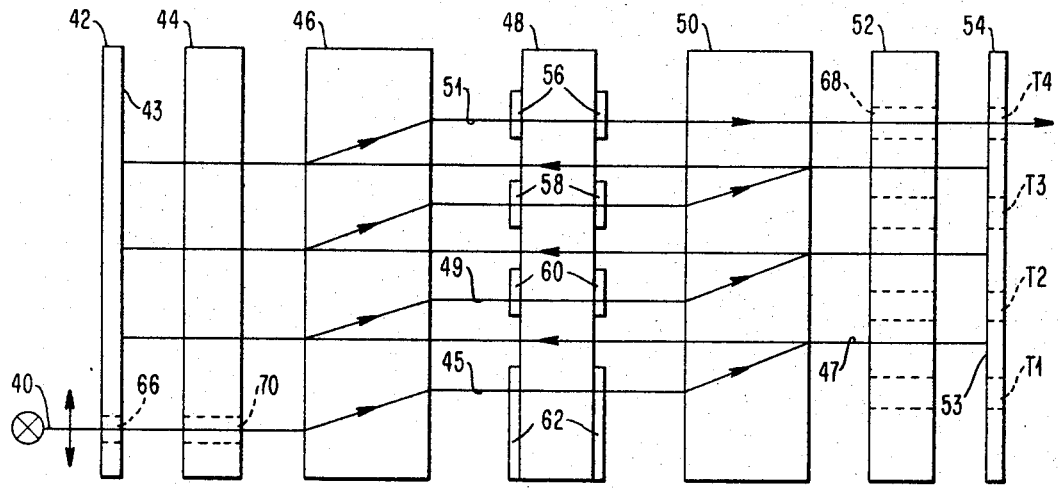

Now referring to FIG. 3b, the operation of the deflector of FIG. 2 whereby the beam is channeled through the upper output aperture T4 is described.

As in FIG. 3a the beam 40 enters the system through the apertures 66 and 70 and is refracted to level 45 by the crystal 46. The switches S1, S2, and S3 are now off (open) and S4 has been turned on. Since no rotation field exists between the electrodes 62, the beam passes through the wave plate 48 undisturbed from its vertical status of polarization. Upon encountering the doubly refracting crystal 50, the beam is refracted up to the level of path 47.

The beam next traverses the quarter-wave plate 52 and in so doing experiences what amounts to, as before mentioned, a 45° rotation of its plane of polarization. After reflecting normally from the surface 53 of the mirror 54 the beam retraverses the wave plate 52 and emerges plane polarized in a horizontal direction.

Still at the level of path 47, the now horizontally polarized beam is propagated straight through the crystal 50, the wave plate 48 (in the non-active region between electrodes 60 and 62) and the crystal 46 to the quarter-wave plate 44. After the beam passes through the wave plate 44 twice (reflecting from the surface 43 of mirror 42 between passes), its plane of polarization has been switched back to vertical so that the crystal 46 refracts the beam into the path 49.

As previously mentioned, the switches S2 and S3 are in the off condition while S4 is in the on condition. Thus it can be seen that the beam will continue to work its way upward in the manner just described until it emerges from the crystal 46 in the upper path 51. The beam then encounters the region of wave plate 48 between the activated electrodes 56 and is switched to a horizontal status of polarization, whereupon it propagates straight through the crystal 50 and out of the system via the upper apertures 68 and T4.

By operating the switches S1–S4 in any of the four patterns represented in the chart of FIG. 4, the output beam is directed through the indicated output aperture. For example, by turning S1 and S2 off and S3 on, the beam is caused to exit the system through the aperture T3.

It will be appreciated that the apparatus of FIG. 2 may be utilized to selectively position the input beam 40 to any one of the vertically aligned apertures T1–T4. The embodiment is thus referred to as a "straight line" deflector. Using the dimensions previously given for the various components, the center-to-center distance between output apertures is seen to be only two millimeters. Also, the total length of the deflector from one end mirror to the other is less than one inch when the components are arranged immediately adjacent one another. The height, of course, is dependent upon the number of output positions utilized, but at two millimeters per position, a deflector having 100 output apertures would have a height of less than eight inches. The width of the deflector need only be large enough to accommodate the apertures, which may be made one millimeter in diameter. Thus, a width of two millimeters is obtainable. This makes it apparent that, in actual practice, the present embodiment is structurally compact.

While for purposes of simplification the switches S1–S4 have been shown symbolically as manually operable contact points, other switching schemes may be used to insure more rapid and reliable application of the polarization-shifting voltage to the electrodes 56, 58, 60, and 62. One such scheme is to utilize the natural capacitance of the opposed pairs of electrodes 56, 58, 60, and 62 by building these electrodes into a pulse propagating circuit. As shown in FIG. 5, the electrodes of like polarity are coupled together by individual inductors 63, thus forming a lumped parameter L–C delay line. A train of scanning pulses 65 of proper amplitude may then be propagated down the delay line, resulting in sequential activation of the several electrodes. Extremely high speed beam scanning is thus accomplished.

Expanding further upon the principles of the present invention, as demonstrated in the deflector-modulator of FIG. 1 and the straight line deflector of FIG. 2, a third embodiment comprising a deflector having a two dimensional coordinate array of output apertures, may be constructed. This embodiment is schematically illustrated in FIG. 6.

Figure 6:
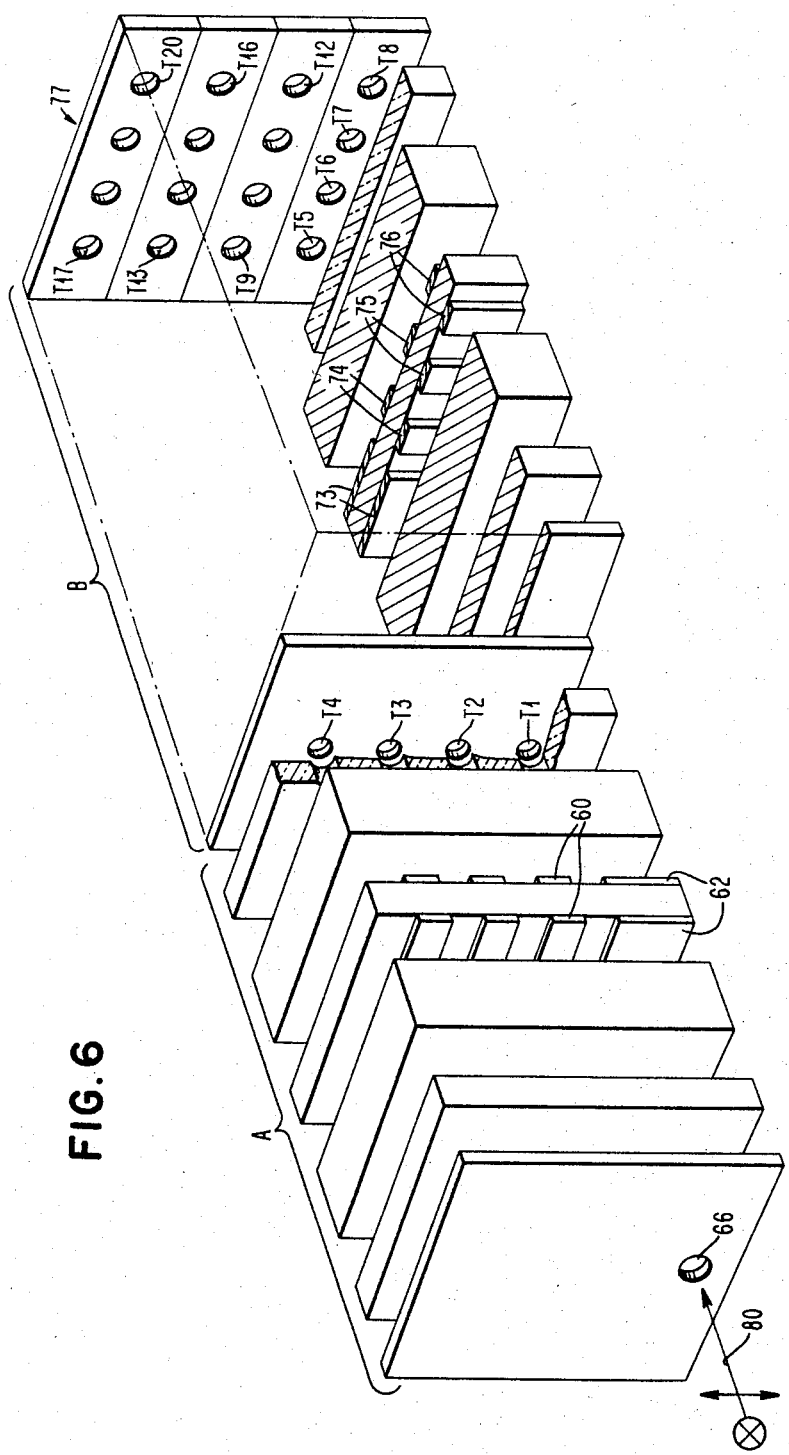
FIG. 6 is a schematic diagram illustrating a preferred embodiment of a beam deflector constructed in accordance with the invention, whereby a beam may be selectively deflected to any one of a plurality of points arranged in a two-dimensional coordinate array.

The deflector of FIG. 6 includes two stages, a vertical deflection stage (bracket A) and a horizontal deflection stage (bracket B). The first stage A comprises a single straight line deflector identical to that of FIG. 2, just described. It will be noted that this stage is oriented to scan an input beam 80 in a vertical line formed by the first stage output apertures T1–T4. The second deflection stage B is identical to the first stage A except that it is oriented at right angles thereto and has four input apertures (not shown), each adjacent to one of the four output apertures T1–T4 of the A stage deflector. Also, the B stage has an end reflector 77 having therein a coordinate array, or raster, or output apertures including the four sets of horizontally aligned apertures T5–T8, T9–T12, T13–T16, and T17–T20. Each of these sets is coplanar with a different one of the apertures T1–T4. Four pairs of electrodes 73, 74, 75, and 76 are provided to activate the half-wave plate 71 of the B stage deflector. The B stage deflector may be thought of as four straight line deflectors stacked one on top of the other.

In operation, the A stage deflector directs the input beam 80 to the four apertures T1–T4 seriatim or in any selected sequence. As previously described in connection with FIGS. 2 and 3, the beam, when exiting the A deflector through one of the apertures T1–T4, is plane polarized in the horizontal direction. The horizontal B stage deflector is thus able to operate on the beam in exactly the same fashion as has previously been described for the straight line deflector of FIG. 2.

The circuitry for activating the eight pairs of half-wave plate electrodes of the deflector of FIG. 6 may comprise two of the pulse delay circuits illustrated for the four sets of electrodes of FIG. 5. By pulsing the several electrodes in the proper sequence, a rapid scan of the output array T5–T20 is achieved. For example, the electrodes 62 are activated for four units of a 16 unit scan-time cycle. While those electrodes are held "on" the four sets of electrodes 73, 74, 75, and 76 are activated for one unit of time each in a series progressing from left to right. This produces a scan of the beam 80 across the apertures T5–T8. Next, the electrodes 62 are switched off and the electrodes 60 are turned on for the next four units of the scan cycle. During that portion of the cycle the electrodes 73, 74, 75, and 76 are again pulsed, this time producing a scan of the apertures T9–T12. The cycle continues in this manner until the top apertures T17–T20 have been scanned, whereupon the cycle begins anew.

It is now apparent that the apparatus of FIG. 6 may be utilized to function as a "flying spot" scanner to interrogate a photographic memory plate or to perform any of the multitude of tasks presently being performed by the well-known cathode ray tube flying spot scanner. Utilizing the dimensions previously given for a single straight line deflector of the present invention, an output array such as the 16 position output array T5–T20 shown in FIG. 6 could be made to include 10,000 apertures grouped in a square (100 x 100) less than eight inches on a side.

It will further be appreciated that the input beam 80 may be supplied by the apparatus of FIG. 1 and may thereby be modulated in either a digital "on-off" manner or in an intensity varying analog fashion as previously described. By synchronizing the modulation of the input beam with the scanning sequence, an optical display of any desired configuration is generated at the output array T5–T20. Thus is produced an apparatus having the same breadth of application as the well-known cathode ray tube. Moreover, direct optical displays may be generated without recourse to phosphorescent transducing means or vacuum envelopes. Such displays can be directly projected onto a viewing screen or onto a photosensitive record medium.

It will be appreciated that a variety of beam deflecting arrangements can be made utilizing the two stage configuration illustrated in FIG. 6. For example, instead of employing a second stage made up of what essentially amounts to a plurality of single horizontal deflection stages stacked one on top of the other (FIG. 6), the second stage may be constructed by placing a plurality of single vertical deflection stages one on top of the other. Thus is produced an expanded version of the deflector shown in FIG. 2. Since the input apertures to the second stage of such a vertically expanded apparatus are necessarily spaced relatively widely apart, it is not possible to place the output apertures of the first stage deflector in direct alignment therewith, as is done in the apparatus of FIG. 6. Instead, light conducting rods or a lens arrangement may be employed to "fan out" the output paths from the first stage deflector. It can be seen that for deflectors having a large number of output apertures, this multistage principle of construction greatly reduces the length of travel which the input beam must undergo, in most cases, to reach a selected output position.

As has been previously brought out, the present invention is embodied in a highly compact structural unit. Further, very high operational speeds may be attained since the only significant speed limitation inherent in the present invention is the switching time of the electro-optic half-wave plates, which time is measured in nanoseconds. Discrete beam deflection is attained in a highly accurate and stable manner since passive doubly refracting crystals alone operate to deflect the beam. The angle of deflection does not depend upon the magnitude of an applied field as it does in a CRT as well as in known light beam deflectors. Deflection is thus not subject to alteration due to changes in the field-producing circuits.

When operating to intensity-modulate an input laser beam as previously described in conection with the apparatus of FIG. 1, the present invention, because of its utilization of a doubly refracting crystal in combination with a separate heat sink, is not subject to the adverse absorption effects which would be experienced by a dichroic analyzer such as is used in known beam modulators. Because dichroic polarizers rely for their polarization effects upon absorption of one of the vibrational components of the incident beam, such an analyzer would be destroyed by even a moderately powerful laser beam. With the present invention, virtually no harmful energy dissipation occurs in the calcite deflection crystal, and the heat sink can be designed to handle even the most powerful laser beams.

While the invention has been particularly shown and described with reference to perferred embodiments thereof, it will be understood by those skilled in the art that the foregoing and other changes in form and details may be made therein without departing from the spirit and scope of the invention.

What is claimed is:

1. A scanner for providing selective deflection of a beam of plane polarized radiation, comprising:
   deflection means including:
      a series of coplanar, linearly arranged polarization plates, each of which rotates the plane of polarization of a plane, polarized beam 90 degrees, only upon activation;
      means for selectively activating said polarization plates;
      a first birefringent medium, adjacent and parallel said series of polarization plates, for transmitting said beam in either a first or a second direction, depending upon the plane of polarization of said beam;
   means for retransmitting through said deflection means those beams which are transmitted in said second direction by said first birefringent medium, including:
      a second birefringent medium, adjacent and parallel said series of polarization plates, for transmitting said beams of radiation in a first or second direction depending upon the plane of polarization of said beams;
      first and second return means parallel said series of polarization plates, for reflecting said beams;
      said first return means having transparent regions therein, through which beams exit from said scanner;
      first and second rotation means, said first rotation means being positioned between said first birefringent medium and said first return means and parallel thereto, said second rotation means being positioned between said second birefringent means and said second return means and parallel thereto, for rotating the plane of polarization of said beams 90 degrees when said beams are passed through said rotation means, are reflected from said return means, and are retransmitted through said rotation means.

2. The scanner of claim 1, wherein said first rotation means has discrete regions therein, which regions do not rotate the plane of polarization of a beam passing therethrough and each of which is aligned with one of said polarization plates, for transmitting without rotation beams which are transmitted in said first direction by said first birefringent medium.

3. The scanner of claim 1, wherein each of said transparent regions is aligned with a different one of said polarization plates.

4. The scanner of claim 1, further including:
   a second deflection means for deflecting beams which exit from said first deflection means, comprising:
      a second series of coplanar polarization plates, linearly arranged in a direction perpendicular to the direction of linear arrangement of the polarization plates in said first series, each of which rotates the plane of polarization of said beams 90 degrees, only upon activation;
      means for selectively activating the polarization plates in said second series;
      a third birefringent medium, adjacent and parallel said second series of polarization plates, whose optic axis is displaced 90 degrees from the optic axis of said first birefringent medium, for transmitting said beams in either a first or second direction, depending on the plane of polarization of said beams;
   means for retransmitting through said second deflection means those beams which are transmitted in said second direction by said third birefringent medium, comprising:
      a fourth birefringent medium whose optic axis is aligned with the optic axis of said third birefringent medium, adjacent and parallel said second series of polarization plates, for transmitting said beams in either a first or a second direction depending on the plane of polarization of said beams;
      third and fourth return means, parallel said second series of polarization plates, said fourth return means having transparent regions therein, through which beams exiting from said first deflection means enter said second deflection means, and said third return means having transparent regions therein through which beams exit from said second deflection means:
      third and fourth rotation means, said third rotation means being positioned between said third return means and said third birefringent medium and parallel thereto, said fourth rotational means is positioned between said fourth return means and said fourth birefringent medium and parallel thereto, for rotating the plane of polarization of said beams 90 degrees when said beams pass through said third and fourth means, are reflected from said third and fourth return means respectively, and are retransmited through said third and fourth rotation means.

5. The scanner of claim 4, wherein each of the transparent regions in said fourth return means is aligned with a different one of the transparent regions of said first return means, and each transparent region of said third return means is located at the projected intersection of the polarization plates of said first series with the polarization plates of said second series, to form a two dimensional coordinate array of said transparent regions on said third return means.

References Cited

UNITED STATES PATENTS 2,262,524    11/1941    Ball _____ 88—65
2,933,972    4/1960    Wenking _____ 88—61

(Other references on following page)

OTHER REFERENCES

Electronics (TK7800 E58), vol. 35, No. 45, pp. 30–32, Nov. 9, 1962.

Optical Processing of Information, edited by Pollack, Koester and Tippett, Sportan Books, Inc., 1963, chapter 8, pages 98–103, by Schmidt. (This paper is a copy of a lecture given at the Symposium on Optical Processing of Information, held on October 23 and 24, 1962 in Washington, D.C., and the information contained therein is considered to be a matter of public knowledge as of the date of the Symposium.)

JEWELL H. PEDERSEN, *Primary Examiner.*

DAVID H. RUBIN, *Examiner.*

R. J. STERN, *Assistant Examiner.*